Nov. 26, 1957  A. G. BUHR  2,814,421
FERTILIZER DISTRIBUTOR
Filed July 5, 1955

Inventor
August G. Buhr
by T. Lloyd LaFave
Attorney

United States Patent Office 2,814,421
Patented Nov. 26, 1957

2,814,421

FERTILIZER DISTRIBUTOR

August G. Buhr, La Crosse, Wis., assignor to Allis-Chalmers Manufacturing Company, Milwaukee, Wis.

Application July 5, 1955, Serial No. 520,044

4 Claims. (Cl. 222—272)

This invention relates to an agricultural implement for distributing lime, chemical fertilizer and like pulverized materials.

A fertilizer distributor having adjustable hopper openings and an agitator for distributing fertilizer material has been used independently and in association with a grain drill for both fertilizing and planting. Such a distributor heretofore employed an agitator that is rigid and sometimes forms a tunnel in the hopper material causing interrupted flow and uneven flow of the material. The agitator frequently jams due to plugging of hopper openings. The fertilizer distributor has also been so constructed that considerable time is lost in removing the agitator and in cleaning the agitator and hopper.

It is an object of the present invention to overcome the above mentioned difficulties by providing a distributor with a simple and ruggedly constructed agitator having inexpensive and easily replaced parts.

It is another object of the present invention to provide an improved agitator for a fertilizer distributor that readily breaks up lumps in the fertilizer without causing breakage of the agitator.

Another object is to provide an improved fertilizer agitator that is flexible to prevent clogging of the agitator and hopper.

Another object is to provide a fertilizer agitator that is readily removed from the hopper to permit easy cleaning of the hopper and agitator.

Another object of the invention is to provide a distributor with an agitator that operates in a manner to insure a uniform discharge of material from the hopper openings.

Other objects and advantages will be apparent upon a reading of the following description with the accompanying drawings, in which.

Figure 1:
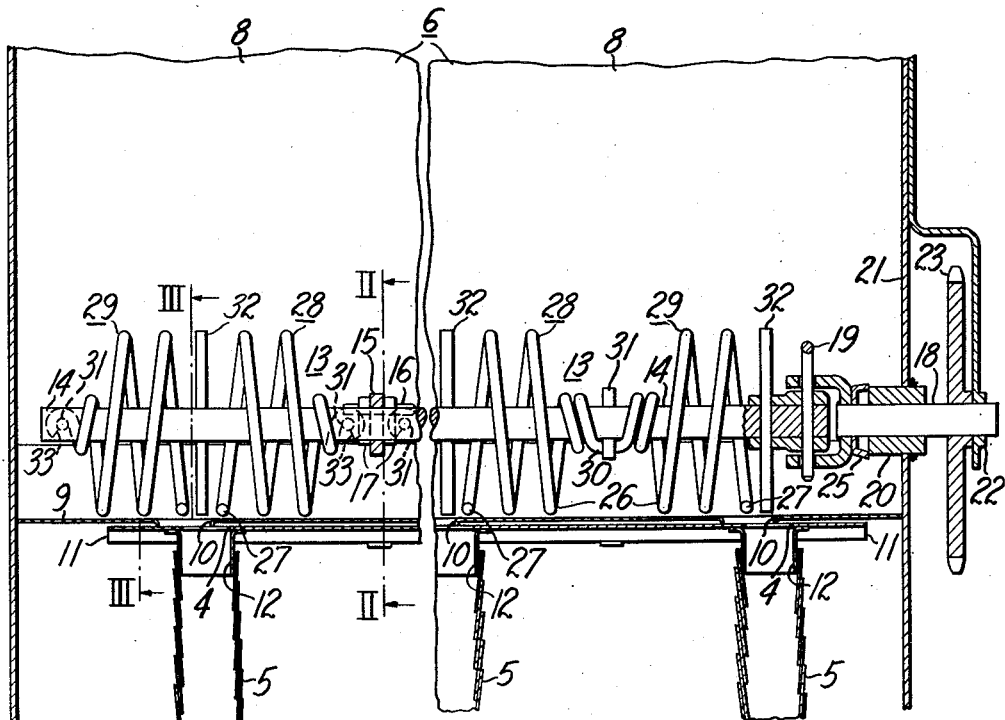
Fig. 1 is a longitudinal sectional view with portions broken away of a fertilizer distributor embodying the present invention.
Figure 3:
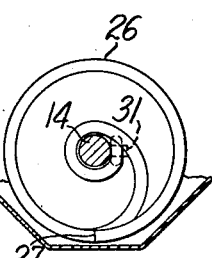
Fig. 3 is a cross sectional view taken along the lines III—III in Fig. 1.
Figure 2:
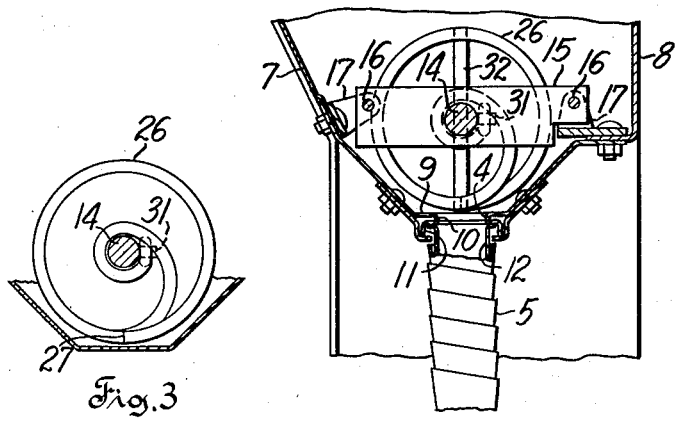
Fig. 2 is a cross sectional view taken along the lines II—II in Fig. 1.

Referring to the drawing, by characters of reference, numeral 6 indicates a hopper for receiving material such as lime or other fertilizers to be distributed either independently of or in conjunction with seed planting. Hopper 6 is suitably supported by any known means and is preferably supported as part of a tractor mounted grain drill, not shown.

Hopper 6 has its longitudinal sides 7, 8 inclined toward a relatively narrow hopper bottom 9. Bottom 9 is bolted to sides 7 and 8 and is provided with a series of holes 10 spaced longitudinally of the bottom for the passage of fertilizer therethrough. A valve plate 11 mounted longitudinally of the bottom has apertures 4 corresponding with said bottom openings and the plate and hopper bottom are relatively movable to vary the registration of hopper openings 10 and valve plate openings 4 for opening and closing the hopper openings to the passage of fertilizer. Valve plate 11 has downwardly extending spouts 12 secured thereto as by welding in alignment with valve openings 4 and flexible ribbon tubes 5 are suitably detachably mounted to down spouts 12.

A rotatable member such as an auger 13 moves fertilizer to the hopper openings 10. Auger 13 comprises a removable assembly including a spindle or shaft 14 disposed longitudinally of the hopper near the hopper bottom and extending through apertured cross members or bearing straps 15 holding the auger against the bottom of the hopper. Bearing straps 15 have ends secured by removable pins 16 to ears 17 on the inclined sides of the hopper bottom to permit ready removal of shaft 14.

The driven end of shaft 14 is positioned in a U-shaped end of a stub drive shaft 18 and locked for rotation therewith by an easily removable pin 19 extending transversely through the socketed ends of shaft 14 and drive shaft 18. Stub drive shaft 18 extends through a sleeve 20 welded to an end wall 21 of the hopper box. An annular cap 25 on shaft 18 abuts an end of sleeve 20 to seal the sleeve to the passage of dust along the shaft through the hopper end wall. The outer end of drive shaft 18 is suitably supported in a bearing bracket 22 attached to end wall 21. A sprocket wheel 23 is mounted on drive shaft 18 between end wall 21 and bearing bracket 22. Sprocket wheel 23 receives a chain, not shown, driven by suitable means such as the rear wheel of a tractor.

Flighting of the auger 13 which is effective to agitate and force fertilizer toward openings 10 in the hopper bottom for uniform distribution therethrough, comprises a series of spaced spring steel coils 26 which are mounted coaxially of shaft 14 for rotation therewith and which extend radially close to the bottom of the hopper. Each coil 26 has free unsecured ends 27, and spirals from such ends in opposite screw directions to an intermediate point 30. In other words, each coil 26 has a left hand helix and a right hand helix, and successive coils 26 present alternately left and right hand coil halves or spiral steel springs 28 and 29. At the intermediate bearing supports 15, the coil halves are separated, and the auger flighting is terminated, at the left of Fig. 1, by a coil half 29 which is fixedly mounted on the end of shaft 14 next to the adjacent end wall of the hopper 6.

Each of the coil halves 28 and 29 is of uniform helix diameter except at the end fixed to the shaft. At this end the spring is tightly wound about the shaft to hold the helix coaxially of the shaft. Intermediate point 30, the apex of the reverse loop between continuous wire coil halves, is secured to the shaft 14 for rotation therewith by a pin 31 mounted in shaft 14 and extending radially therefrom through the apex of such reverse loop. The ends 33 of separated coil halves are bent to form an eye for receiving pin 31. Pins 31 transmit torque of shaft 14 to the helices to rotate them through hopper material, and they also transmit axial thrust from the composite coils 26 and from the individual coil halves 28, 29 to the shaft 14, for restraining bodily movement thereof along the shaft.

The free unsecured end 27 of each of the helices is of uniform cross section with the remainder of the helix. Each helix is wound to have a diameter at the free end 27 substantially larger than the diameter of shaft 14, so that said free end is spaced radially from and movable axially relative to the shaft and its flexibility will cause it to rub on the floor or bottom of the hopper when forcing fertilizer toward the valve openings in the hopper bottom.

The free end 27 of one helix is adjacent the free end of another helix and such free ends are positioned adjacent corresponding hopper openings 10. Upon rotation of shaft 14 the helices feed fertilizer from the intermediate point 30 fixed with the shaft toward the free ends 27 and toward hopper openings 10. The helices, being spiral springs with the forward ends free, may flex axially and radially when they are swept through the hopper material by rotation of shaft 14, and such flexing of the helices upon change in resistance offered by the fertilizer is effective to break up lumps in the fertilizer and prevent jamming of the auger.

Foreign material such as wire, paper, string, or rags may get into the fertilizer hopper and become entangled with the spiral springs. Such entangled material will be automatically released or shed from the spiral springs by slipping off the free ends of the spiral springs as they are rotated.

A rigid radial projection is formed on shaft 14 between the adjacent free ends of helices, by pins 32 extending transversely therethrough to the bottom of the hopper and in alignment with hopper openings 10, to keep such openings clear of fertilizer clumps that might lodge or form there.

Although but one embodiment of the present invention has been shown and described it should be obvious to those skilled in the art that various changes and modifications may be made therein within the scope of the appended claims.

What is claimed is:

1. A distributor comprising a longitudinally extending hopper for receiving material, said hopper having a bottom having a plurality of spaced openings for the passage of material therethrough, a rotatable spindle disposed longitudinally of said hopper in the bottom portion thereof, and auger flighting operatively connected with said spindle for agitating hopper material and feeding it to said openings, said auger flighting comprising a series of wire coils each having a midportion connected in radially supported relation with said spindle, and free opposite end portions in radially spaced, axially movable relation to said spindle; and means operatively connecting each of said wire coils at said midportion thereof in axial thrust and torque transmitting relation with said spindle.

2. A distributor comprising a hopper for receiving distributable material, said hopper having a bottom provided with a plurality of longitudinally spaced openings for the passage of the material therethrough, a rotatable auger disposed in the bottom of said hopper adjacent said openings, said auger comprising a shaft and a plurality of spaced axially aligned coils having free ends adjacent said openings, each of said coils spiralling from its free ends to an intermediate point to form left hand and right hand spiral springs and means securing said coils to said shaft only at said intermediate points of said coils.

3. A distributor comprising a longitudinally extending hopper for receiving fertilizer, said hopper having a bottom having a series of longitudinally spaced openings for the passage of fertilizer therethrough, a rotatable shaft disposed longitudinally in the bottom portion of said hopper, and auger flighting operatively connected with said shaft for agitating hopper material and feeding it to said openings, said auger flighting comprising a series of alternately right and left hand spiral wire springs each having a mounting portion radially supported on said shaft and a free end portion in radially spaced and axially movable relation thereto; and means operatively connecting said springs, at said mounting portions thereof, in axial thrust and torque transmitting relation to axially spaced portions, respectively, of said shaft so as to position said free ends of said springs in proximity to said openings.

4. A distributor comprising a longitudinally extending hopper for receiving fertilizer, said hopper having a bottom having a series of longitudinally spaced openings for the passage of fertilizer therethrough, a rotatable shaft disposed longitudinally in the bottom portion of said hopper, and auger flighting operatively connected with said shaft for agitating hopper material and feeding it to said openings, said auger flighting comprising a series of spiral wire springs each having a mounting portion radially supported on said shaft and a free end portion in radially spaced and axially movable relation thereto; and means operatively connecting said springs, at said mounting portions thereof, in axial thrust and torque transmitting relation to axially spaced portions, respectively, of said shaft so as to position said free ends of said springs in proximity to said openings.

References Cited in the file of this patent

UNITED STATES PATENTS

| | | |
|---|---|---|
| 1,947,379 | Cargill | Feb. 13, 1934 |
| 2,355,728 | Hyland | Aug. 15, 1944 |